(12) United States Patent
Okoren et al.

(10) Patent No.: US 8,454,229 B2
(45) Date of Patent: Jun. 4, 2013

(54) METHOD FOR SENSING A FLUID IN A COMPRESSOR SHELL

(75) Inventors: Ronald W. Okoren, Holmen, WI (US); Jerry E. Brown, La Crosse, WI (US); Joel C. VanderZee, La Crosse, WI (US); Charles E. Nelson, Coon Valley, WI (US); Steven K. Klingemann, West Salem, WI (US); Jeffrey J. DeGroot, Onalaska, WI (US)

(73) Assignee: Trane International Inc., Piscataway, NJ (US)

( * ) Notice: Subject to any disclaimer, the term of this patent is extended or adjusted under 35 U.S.C. 154(b) by 136 days.

(21) Appl. No.: 12/928,113

(22) Filed: Dec. 3, 2010

(65) Prior Publication Data
US 2011/0075699 A1    Mar. 31, 2011

Related U.S. Application Data

(62) Division of application No. 11/786,344, filed on Apr. 11, 2007, now Pat. No. 7,874,724.

(51) Int. Cl.
*G01N 25/40*    (2006.01)
*G01N 25/58*    (2006.01)
*G01N 25/70*    (2006.01)
*G01K 7/22*     (2006.01)

(52) U.S. Cl.
USPC ............... 374/45; 374/27; 374/185; 374/107; 374/29; 374/164; 702/130

(58) Field of Classification Search
USPC ........ 374/141–143, 147–148, 100, 102–103, 374/183, 185, 170–172, 4–5, 29, 30, 39, 374/16, 27, 45, 107, 112, 135, 137, 163–165; 702/130, 99
See application file for complete search history.

(56) References Cited

U.S. PATENT DOCUMENTS 3,280,576 A    10/1966   Endress
3,366,942 A *  1/1968   Deane ........................... 340/608

(Continued)

FOREIGN PATENT DOCUMENTS

DE    2357469 A  *  5/1975
JP    2006029160 A *  2/2006
JP    2006105061 A *  4/2006

OTHER PUBLICATIONS

"Response Compensation of Thermistors: Frequency Response and Identification of Theremal Time Constatnt," Reviw of Scientific Instruments, Mar. 2003, vol. 74, No. 3.

*Primary Examiner* — Gail Verbitsky
(74) *Attorney, Agent, or Firm* — William O'Driscoll

(57) ABSTRACT

Two vertically offset thermistors for sensing a fluid such as oil and refrigerant in a compressor shell are monitored by a method that takes into account rapidly changing conditions within the shell. The system can determine the fluid's sump temperature, high/low liquid levels, and can determine whether the thermistors are sensing the fluid as a liquid, gas, or a mixture of the two, such as a foam or mist of liquid and gas. For greater accuracy, thermistor readings can be dithered and filtered to provide temperature or voltage values having more significant digits than the readings originally processed through a limited-bit A/D converter. For faster response, limited microprocessor time is conserved by sampling thermistor readings at strategic periods that enable the microprocessor to identify certain conditions and temperatures via simple delta-temperature ratios and undemanding equations rather than resorting to exponential functions or lookup tables to determine time constants.

10 Claims, 3 Drawing Sheets

U.S. PATENT DOCUMENTS

| | | | |
|---|---|---|---|
| 3,535,053 A * | 10/1970 | Jednacz | 417/18 |
| 3,744,267 A | 7/1973 | Norbeck | |
| 3,803,913 A * | 4/1974 | Tracer | 73/204.14 |
| 4,090,371 A | 5/1978 | Keane | |
| 4,106,331 A * | 8/1978 | Bunton et al. | 73/61.46 |
| 4,356,825 A * | 11/1982 | Veth | 600/301 |
| 4,412,752 A * | 11/1983 | Cellitti et al. | 374/43 |
| 4,618,266 A * | 10/1986 | Feller | 374/41 |
| 4,720,997 A | 1/1988 | Doak et al. | |
| 4,841,734 A * | 6/1989 | Torrence | 62/115 |
| 4,987,749 A * | 1/1991 | Baier | 62/222 |
| 5,079,498 A | 1/1992 | Cleasby et al. | |
| 5,100,245 A * | 3/1992 | Glennon et al. | 374/148 |
| 5,117,089 A * | 5/1992 | Honkomp et al. | 219/201 |
| 5,131,455 A | 7/1992 | Tsuchiyama et al. | |
| 5,144,814 A * | 9/1992 | Gaudette | 62/225 |
| 5,335,513 A * | 8/1994 | Campbell et al. | 62/228.3 |
| 5,431,026 A | 7/1995 | Jaster | |
| 5,522,231 A * | 6/1996 | Kenyon et al. | 62/129 |
| 5,555,927 A * | 9/1996 | Shah | 165/239 |
| 5,601,363 A | 2/1997 | Keil et al. | |
| 5,655,379 A | 8/1997 | Jaster et al. | |
| 5,778,695 A | 7/1998 | Ring et al. | |
| 5,864,311 A | 1/1999 | Johnson et al. | |
| 6,131,471 A | 10/2000 | Okoren et al. | |
| 6,546,796 B2 | 4/2003 | Zimmermann et al. | |
| 6,578,373 B1 | 6/2003 | Barbier | |
| 6,698,921 B2 | 3/2004 | Siefert | |
| 6,886,354 B2 | 5/2005 | Dudley | |
| 7,193,187 B2 | 3/2007 | Chen et al. | |
| 7,398,151 B1 | 7/2008 | Burrell et al. | |
| 7,568,894 B2 * | 8/2009 | Uratani | 417/63 |
| 2006/0018763 A1 * | 1/2006 | Uratani | 417/32 |
| 2008/0101743 A1 | 5/2008 | Duggan et al. | |
| 2008/0175719 A1 | 7/2008 | Tracey et al. | |
| 2008/0236144 A1 | 10/2008 | Nakata et al. | |
| 2009/0099498 A1 | 4/2009 | Demers et al. | |

* cited by examiner

METHOD FOR SENSING A FLUID IN A COMPRESSOR SHELL

CROSS REFERENCE TO RELATED APPLICATIONS

This application is a division of application Ser. No. 11/786,344 filed on Apr. 11, 2007 now U.S. Pat. No. 7,874,724.

FIELD OF THE INVENTION

The subject invention generally pertains to a device and method for sensing the liquid level and temperature of a fluid in a compressor and more specifically to a method that can distinguish whether a sensor is detecting a liquid, gas or foam.

BACKGROUND OF RELATED ART

A thermistor's electrical resistance changes as a function of its temperature, which is the basic principle that enables thermistors to be used for sensing fluid temperatures or liquid levels.

For example, to sense whether a liquid level has reached a certain upper limit, a thermistor with a positive or negative temperature coefficient can be energized to electrically heat the thermistor to a temperature above that of the liquid. Then, if the liquid level is below the thermistor, the relatively low heat transfer rate between the electrically heated thermistor and the gas above the liquid allows the thermistor's temperature to remain elevated. If, however, the liquid level rises to that of the thermistor, the cooler liquid quenches the thermistor, thereby changing the thermistor's electrical resistance. The thermistor's electrical resistance can thus be monitored as a means for determining whether the liquid level is above or below the thermistor. An example of a previous use of a thermistor to measure temperature in a refrigerant line is shown in commonly assigned U.S. Pat. No. 4,987,749 to Baier, which is hereby incorporated by reference.

When a thermistor is used as a temperature sensor to determine the actual temperature of a fluid, it is not necessary to electrically heat the thermistor. Instead, the varying temperature of the fluid itself is what changes the thermistor's temperature and thus changes its electrical resistance as well. Unfortunately, however, the thermistor's temperature lags a fluid's changing temperature due to a limited heat transfer rate between the thermistor and the surrounding fluid.

The thermistor's delay in reaching the temperature of the surrounding fluid is not always a problem, but it can be in certain applications. When this technology, for example, is used in a conventional manner to sense the oil/refrigerant fluid conditions within the sump of a refrigerant compressor, the fluid conditions can change so suddenly that the thermistor's electrical resistance might inaccurately represent the actual conditions within the sump. As a result, the thermistors might fail to detect a fluid related problem.

At startup, for instance, a refrigerant compressor might experience a rapid loss of oil due to excessive foaming within the compressor's sump. Such foaming can be caused by a suction line blockage, closed expansion valve, closed service valve, or some other problem. If the problem causes the suction pressure to fall quickly and low enough, the refrigerant mixed in the sump oil will flash, which can suddenly produce an expanded foamy mixture of oil and refrigerant vapor. If a thermistor is too slow to detect the rapid change in fluid level or temperature, the control system might allow the compressor to continue operating under these conditions. Thus, the compressor might ingest the foamy mixture, creating a liquid slugging problem, and discharge the mixture, thereby losing oil that is needed for ongoing compressor operation.

Although various types of sensors might be used for detecting such problems, conventional sensors with existing control schemes can be too slow to react in time to protect the compressor, and faster control schemes can be too expensive. Consequently, there is a need for a cost effective way of accurately detecting and responding to sudden adverse conditions of a refrigerant compressor.

SUMMARY OF THE INVENTION

It is an object of the invention to quickly and accurately determine the temperature of a fluid surrounding a thermistor that is alternately heated by electrical current and cooled by the fluid.

Another object of some embodiments is to quickly and accurately determine whether a thermistor is exposed to a liquid, gas or mixture of the two.

Another object of some embodiments is to provide an alternative to identifying a time constant for a thermistor, thereby avoiding processor time normally spent on calculating exponents of natural log functions or accessing exponential lookup tables.

Another object of some embodiments is to use the "decaying" temperature of a cooling thermistor to determine the temperature of a surrounding fluid even though the fluid's temperature changes appreciably as the thermistor cools.

Another object of some embodiments is to apply a DC signal voltage to a thermistor, wherein the DC signal voltage carries a ripple voltage used for dithering a reading from the thermistor.

Another object of some embodiments is to synchronize the high frequency ripple voltage with the rate at which the signal from the thermistor is sampled.

Another object of some embodiments is to apply a method that provides a temperature or voltage value having more significant digits than a dithered temperature or voltage reading upon which the higher-precision value is based.

Another object of some embodiments is to strategically select the duration between voltage or temperature readings of a cooling thermistor so that the readings can be readily used to determine whether a fluid surrounding the thermistor is a liquid, gas or foam without having to resort to exponential functions or lookup tables.

Another object of some embodiments is to strategically select the duration between voltage or temperature readings of a cooling thermistor so that the readings can be readily used to determine the temperature of a surrounding fluid without having to resort to exponential functions or lookup tables.

Another object of some embodiments is to filter voltage or temperature readings to provide more significant values.

Another object of some embodiments is to filter delta-temperature ratios to provide more significant values.

Another object of some embodiments is to use the wire leads of a thermistor to suspend the main body of the thermistor within a tubular sheath.

Another object of some embodiments is to install a pair of thermistors within a tubular sheath that is curved lengthwise to fit within the limited space of a hermetically sealed shell of a refrigerant compressor.

Another object of some embodiments is to install a thermistor within a tubular sheath that helps shield the thermistor from gas currents and splashing.

Another object of some embodiments is to install a thermistor within a protective tubular sheath that has an upper vent for conveying gas in and out from within the sheath.

Another object of some embodiments is to install a thermistor within a sheath that includes a lower opening that is submerged in liquid to obstruct the flow of gas through the sheath.

One or more of these and/or other objects of the invention are provided by a thermistor disposed within a compressor shell, wherein the thermistor is monitored using a method that accurately factors in rapidly changing conditions inside the shell.

DESCRIPTION OF THE PREFERRED EMBODIMENT

Figure 1:
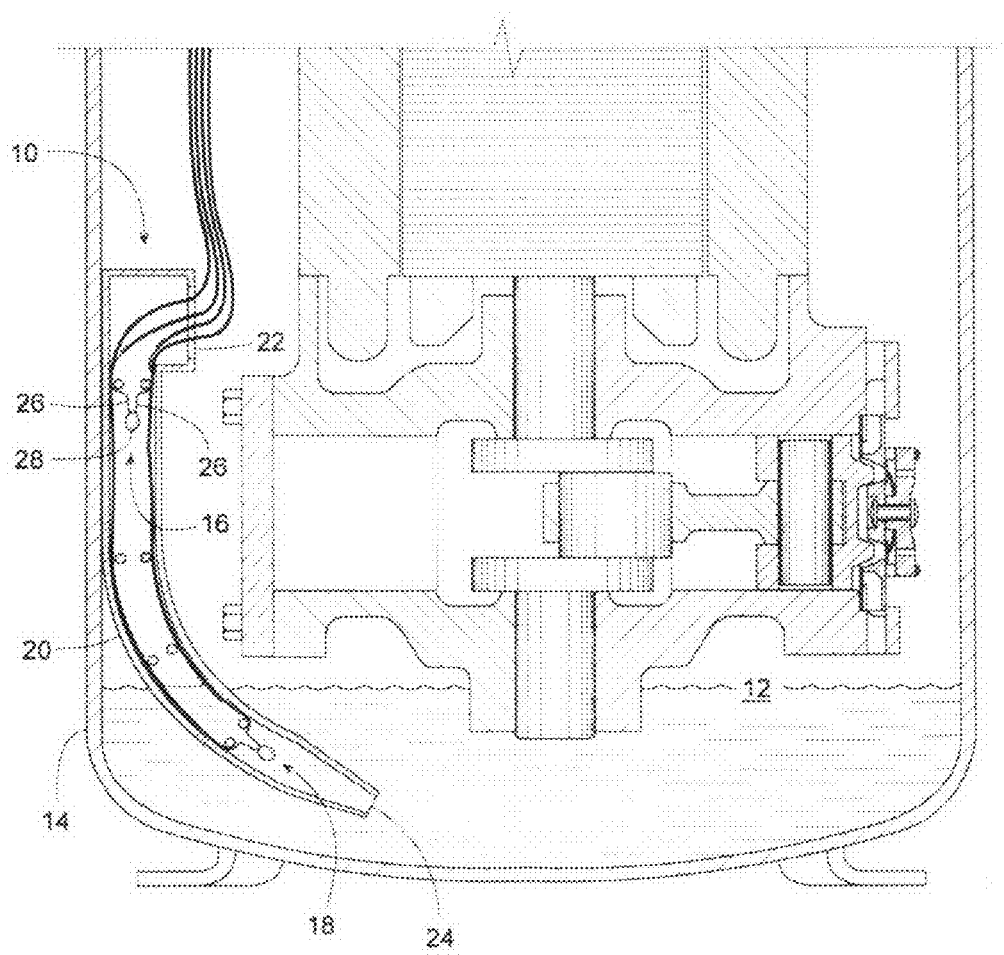
FIG. 1 is a cross-sectional view of a lower portion of a compressor shell that contains two thermistors.

FIG. 1 shows a device 10 for sensing a fluid 12, such as oil and/or refrigerant within a hermetically sealed compressor shell 14. Although FIG. 1 shows a reciprocating compressor, other types of compressors, preferably scroll compressors but also other compressors such as screw or centrifugal, are well within the scope of the invention. Regardless of the type of compressor, device 10 can determine the fluid's sump temperature, high/low liquid levels, and determine whether it is sensing fluid 12 as a liquid, gas, or a mixture of the two, such as a foam or mist of gas and liquid. The compressor's sump temperature is the temperature of fluid 12 preferably in liquid form at the bottom of shell 14.

Since fluidic and thermodynamic conditions can change so rapidly within compressor shell 14, device 10 needs to be extremely accurate and have an exceptionally fast response time. To accomplish this with relatively inexpensive sensors and an affordable microprocessor, several hardware and firmware features were incorporated in the design.

The sensors, for instance, are small, inexpensive thermistors 16 and 18, such as a General Electric NK222C1R2 thermistor. Although this particular thermistor has a negative temperature coefficient, PTC thermistors could also be used. The term, "thermistor" as used herein and throughout broadly refers to any currently known sensor or future sensor having an electrical characteristic that changes as a function of its temperature. Examples of thermistors include, but are not limited to, a NTC thermistor, PTC thermistor, silicon temperature sensor, etc. Thermistors with low thermal mass, which improves their responsiveness, are currently preferred.

Thermistors 16 and 18 are installed at certain different elevations, so they can detect if fluid 12 reaches certain high or low liquid level limits. Such limits can then be used for tripping an alarm or de-energizing the compressor.

To help shield thermistors 16 and 18 from fast moving gas currents and splashing within shell 14, the thermistors can be installed within a tubular sheath 20. In some cases, sheath 20 can be curved lengthwise to fit within limited spaces or to reach certain areas if necessary. For damping, openings 22 and 24 in sheath 20 provide restricted fluid communication between fluid 12 and the thermistors. Within sheath 20, each thermistor is preferably held in suspension by its electrical wire leads 26 to prevent the thermistor's main body 28 from contacting anything other than fluid 12. If sheath 20 is made of an electrically nonconductive material, such as nylon 6, 6, then the thermistor's leads 26 can be attached to sheath 20 directly, thereby eliminating the need for mounting the thermistors to a circuit board disposed within sheath 20.

Figure 2:
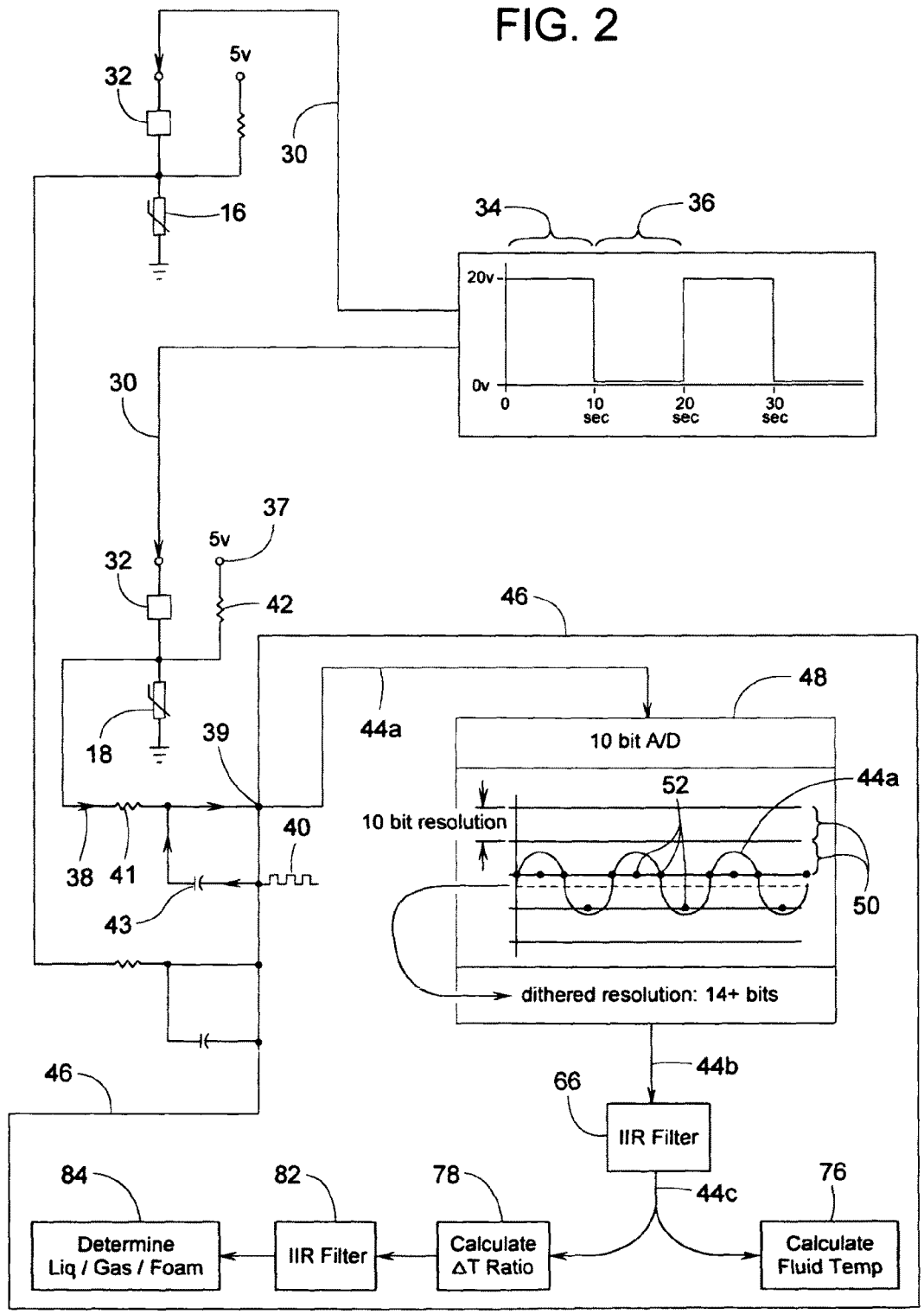
FIG. 2 is a schematic diagram illustrating a method for sensing a fluid.
Figure 3:
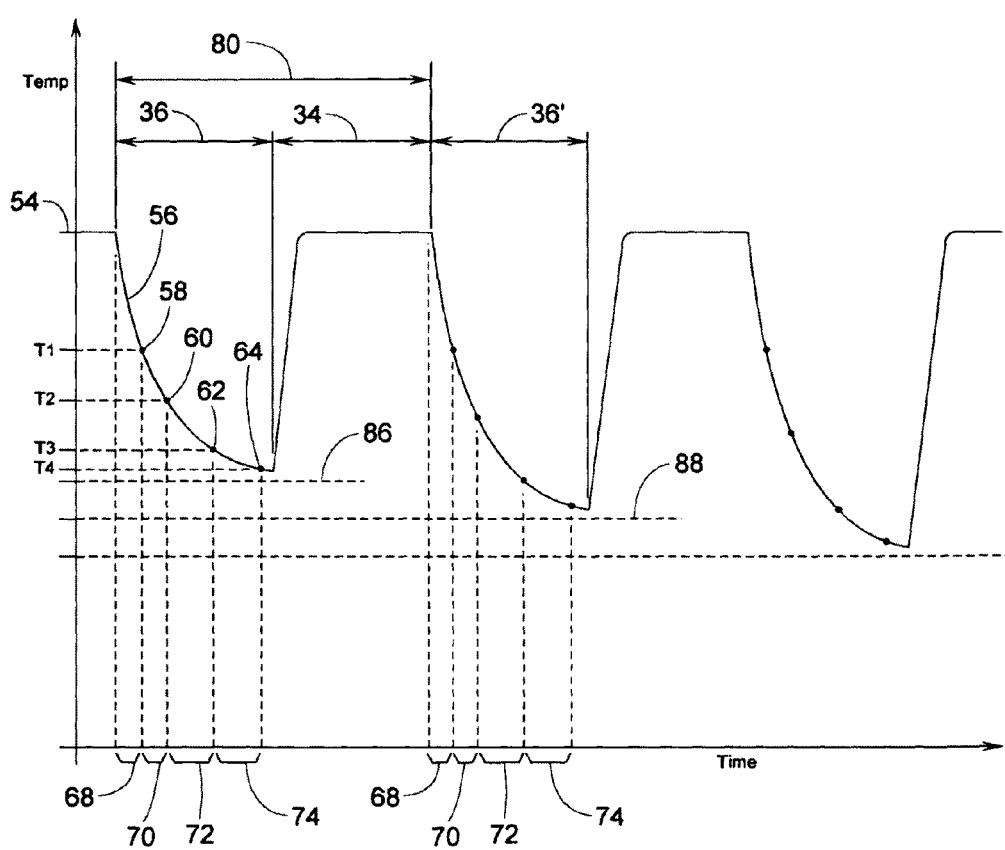
FIG. 3 is a graph illustrating the cyclical heating and cooling of a thermistor.

To accurately and rapidly sense the condition of fluid 12, thermistors 16 and 18 are monitored by a method illustrated in FIGS. 2 and 3. The method will be described with reference primarily to lower thermistor 18, however, the same method can, and preferably is, applied to upper thermistor 16 as well. In a currently preferred embodiment, thermistor 18 is cyclically heated and allowed to cool by applying a pulsed DC voltage signal 30. If the electrical resistance of thermistor 18 becomes too low, a conventional current limiting circuit 32 can be used to protect thermistor 18. In some embodiments, signal 30 has an amplitude of about 20 volts to heat thermistor 18 during a ten-second heating cycle 34, and then the voltage of signal 30 drops dramatically (e.g., to zero volts) to allow fluid 12 to cool thermistor 18 during a ten-second cooling down cycle 36. It should be noted, however, that signal 30 can have any appropriate voltage amplitude and pulse duration.

During the cooling down cycle 36, a resistor 42 conveys a DC voltage 37 to thermistor 18, and a second resistor 41 conveys the resulting feedback signal 38 to an A/D input 39 of a microprocessor 46 (e.g., Atmel ATmega 32-16AU provided by Atmel Corp. of San Jose, Calif.). The source of signal 38 can be any appropriate voltage (e.g., 5 VDC) that allows monitoring the changing resistance of thermistor 18 as it cools. In some embodiments of the invention, an output 40 of microprocessor 46 superimposes or adds a ripple signal (via a capacitor 43) and resistor (not shown) onto the feedback signal entering input 39. The amplitude and frequency of ripple signal 40 can be such that ripple signal 40 can be used in a dithering method that increases the resolution of a dithered input 44a that reflects the resistance and thus the temperature of thermistor 18. A dithering method is described in U.S. Pat. No. 6,049,299, which is specifically incorporated by reference herein.

Throughout the cooling down cycle, microprocessor 46 can repeatedly sample reading 44a via A/D converter 48, which in this particular example is a 10-bit A/D converter; however, higher resolution A/D converters are well within the scope of the invention. Nonetheless, in the case of a limited 10-bit resolution or other limited resolutions, input readings 44a can be digitized in discrete increments 50 of about 0.1° F. Since such resolution is generally inadequate for the present application, repeated sampling of input readings 44a provides a series of points 52 with values that vary within an extremely short period of time (e.g., few msec or less) due to ripple signal 40. Ripple signal 40 and its resulting dithered input 44a are preferably synchronized with the sampling rate at input 39. A plurality of points 52 (e.g., 64 points) collected over a certain sample period (e.g., 20 msec) can then be averaged or otherwise interpreted for calculating a dither-based temperature signal 44b having a resolution much finer than 0.1° F., such as for example 0.01° F. or perhaps even 0.002° F. with additional signal filtering. The term, "dither-based temperature" as used herein and throughout refers to a calculated value having a finer resolution or more significant digits than dithered input values upon which the calculated value is at least partially based. The dither-based temperature or calculated value can be in any units including, but not limited to, ° F., ° C., volts, or can even be a number without units. In cases where A/D converter 48 has a sufficiently high resolution, e.g., 16-bits, such a resolution might render a dithering method unnecessary.

To determine the fluid's sump temperature and to determine whether fluid 12 is a liquid, gas, or a mixture of the two, dither-based temperature values (or otherwise high resolution temperature values) can be calculated to identify the temperature of thermistor 18 at three or more instances as thermistor 18 cools. For example, referring to FIG. 3, as thermistor 18 cools from an upper heated temperature 54, dither-based temperature values can be calculated generally continuously along the full length of a curve 56; however, dither-based temperature values are particularly relevant during sample periods at a first temperature point 58 (T1), a second temperature point 60 (T2), a third temperature point 62 (T3), and perhaps a fourth temperature point 64 (T4).

For greater resolution, temperatures for those points in time can be calculated by filtering the dither-based temperature readings 44b through an IIR filter 66 to provide filtered temperatures 44c. Filter 66, for example, might calculate a filtered temperature at second point 60 as being equal to $\frac{1}{16}$th of the dither-based temperature value for a 20 msec period that includes point 60 plus $\frac{15}{16}^{th}$ of the dither-based temperature value for the immediately preceding 20 msec period. Filter 66 can be firmware code executed by microprocessor 46.

The temperature of thermistor 18 at three of the points, such as points 58, 60 and 62 or points 60, 62 and 64 can be used to calculate the sump temperature of fluid 12 (asymptote of curve 56). If the relative times at which points 58, 60 and 62 or points 60, 62 and 64 occur are strategically chosen, the sump temperature of fluid 12 can be calculated without having to resort to exponential lookup tables or exponential functions, both of which would be time consuming tasks for a relatively inexpensive microprocessor. Also, with properly chosen times, a simple delta-temperature ratio, instead of a more difficult to determine time constant, can be used to establish whether the fluid being sensed is a liquid, gas or foam.

Although various strategic times can be chosen, in a currently preferred embodiment, first point 58 occurs at a 1.75 sec period 68 after the cooling down cycle begins. Through experimentation, the 1.75 sec delay was found to work well in not only minimizing negative effects caused by the thermal mass of a thermistor but also works well in maximizing the signal-to-noise ratio for calculations used in distinguishing between liquid and vapor immersion. Second point 60 occurs at a 1.5-sec period 70 after point 58, and third point 62 occurs at a 3-sec period 72 after second point 60. Although periods 70 and 72 can be other than 1.5 and 3 seconds, having period 72 be twice as long as period 70 simplifies the math by avoiding the need to determine an actual time constant of curve 56 because the time constants cancel out. For a curve of a given time constant, the temperature change during period 70 can be approximately the same as the temperature change during period 72. Fourth point 64 can be at a 3-second period 74 after point 62 so that periods 72 and 74 are the same, which simplifies the calculation for determining the sump temperature.

With the aforementioned times of three seconds for periods 72 and 74, firmware code 76 of microprocessor 46 can execute one or more of the following equations to calculate ST (fluid's sump temperature).

$$ST = T2 - \{(T3-T2)^2/[(T4-T3)-(T3-T2)]\}$$

$$ST = T3 + \{(T4-T3)(T2-T3)/[(T4-T3)-(T3-T2)]\}$$

$$ST = T4 - \{(T3-T4)^2/[(T2-T3)-(T3-T4)]\}$$

Although these equations use T2, T3 and T4 at points 60, 62 and 64 respectively, it would also be well within the scope of the invention to use T1, T2 and T3 instead; however the equation needed to do so might be more complicated because periods 70 and 72 are not of the same duration.

Period 72 being twice as long as period 70, however, makes it relatively easy to determine whether a thermistor is sensing fluid 12 as a liquid, gas or foam. To do this, microprocessor 46 uses firmware code 78 to calculate the following DTR (delta-temperature ratio):

$$DTR = \{(T2-T3) - [(ST_{n-1}-ST_n)(3/20)]\} / \{(T1-T2) - [(ST_{n-1}-ST_n)(1.5/20)]\}$$

For the above equation, (T2−T3) in the numerator and (T1−T2) in the denominator represent a basic delta-temperature ratio that is a function of a time constant for an exponentially decaying temperature curve where the curve's asymptote is constant. For the present invention, however, the fluid's sump temperature (asymptote of a decaying temperature curve) can change rapidly, which affects the curve's shape and delta-temperature ratio. To account for this effect, microprocessor 46 notes the calculated sump temperature ST as it changes from one cooling down cycle 36 ($ST_{n-1}$=asymptote 86) to the next cooling down cycle 36' ($ST_n$=asymptote 88) and factors this change into the delta-temperature ratio using the terms ($ST_{n-1}-ST_n$), (3/20), and (1.5/20). $ST_{n-1}$ represents the asymptote or sump temperature calculated based on the most recent cooling down cycle, and $ST_{n-1}$ represents the asymptote or sump temperature calculated based on the previous cooling down cycle. Thus ($ST_{n-1}-ST_n$) is the amount the sump temperature changes over one complete heating and cooling down cycle, which in this example occurs in 20 seconds (e.g., see dimension 80). Of that 20-second cycle, it is estimated that during the 1.5-second period between T1 and T2 the sump temperature changes ($ST_{n-1}-ST_n$)(1.5/20), and during the 3-second period between T2 and T3, the sump temperature changes ($ST_{n-1}-ST_n$)(3/20), thus the delta-temperature ratio is adjusted accordingly.

Block 78 schematically represents microprocessor 46 calculating a new delta-temperature ratio for every cooling down cycle. Each calculation is similar in that the same delta-temperature equation is applied; however, different sump temperatures result in different delta-temperature values. To minimize noise and aberrant delta-temperature ratios, each calculated ratio is limited between 0.6 and 1.8, and an 1 W firmware filter 82 applies a ¼ multiplier to the most current delta-temperature ratio and adds that to ¾ of the previously filtered delta-temperature ratio. Block 84 schematically represents the resulting delta-temperature ratio being compared to delta-temperature ratios that are known to be characteristic of a thermistor being cooled by a liquid, gas or foam. Depending on the application, in some cases, delta-temperature ratios below about 1.0 indicate a thermistor being cooled by liquid, ratios above 1.2 can indicate a thermistor being cooled by gas, and ratios between 1.0 and 1.2 can indicate the presence of a foam or mist.

While lower thermistor 18 is monitored (as just described) to determine the sump temperature, to act as a lower liquid level limit, and to determine whether lower thermistor 18 is sensing liquid, gas or foam, upper thermistor 16 can be monitored in a similar manner but perhaps only to serve as an upper liquid level limit and to determine whether upper thermistor 16 is sensing liquid, gas or foam. For some if not all applications, upper thermistor 16 is not used for determining the sump temperature. Some applications might only need a single thermistor.

Although the invention is described with respect to a preferred embodiment and has been implemented with regard to scroll compressors, modifications of the invention and applications to other compressors thereto will be apparent to those of ordinary skill in the art. The scope of the invention, therefore, is to be determined by reference to the following claims:

The invention claimed is:

1. A method for sensing a fluid in a compressor, wherein the fluid can exist in a plurality of states including at least one of a liquid state, a gaseous state, and a gas/liquid mixture, the method comprising:

positioning a thermistor in heat transfer relationship with the fluid;

electrically heating the thermistor to a heated temperature that is higher than a fluid temperature of the fluid;

after electrically heating the thermistor, allowing the thermistor to cool toward the fluid temperature, wherein the thermistor cools at a cooling rate;

as the thermistor cools, determining the cooling rate by repeatedly sampling a temperature of the thermistor over a sample period;

determining in which state the fluid exists based on the cooling rate; and determining the fluid temperature based on the cooling rate, wherein the fluid temperature is determined prior to the thermistor actually reaching the fluid temperature and the step of determining the fluid temperature is accomplished independent of any calculated time constant, exponential function, and exponential look up table.

2. The method of claim 1 including the further step of establishing a delta temperature ratio as a function of the cooling rate.

3. The method of claim 2 wherein a delta temperature ratio below about 1.0 indicates a liquid state, a delta temperature ratio above about 1.2 indicates a gaseous state, and a delta temperature ratio between about 1.0 and 1.2 indicates a foamy or misty state.

4. The method of claim 1, further comprising cyclically electrically heating and thermally cooling the thermistor so that the thermistor experiences a plurality of temperatures during a plurality of heating and cooling cycles.

5. The method of claim 4, further comprising determining in which state the fluid exists based on the plurality of temperatures during the plurality of heating and cooling cycles.

6. The method of claim 5 including the further step of establishing a delta temperature ratio as a function of the cooling rate.

7. The method of claim 6, further comprising applying a reduced voltage to the thermistor, thereby allowing the thermistor to cool toward the fluid temperature.

8. The method of claim 1, further comprising applying a reduced voltage to the thermistor, thereby allowing the thermistor to cool toward the fluid temperature.

9. The method of claim 1, wherein the thermistor is a first thermistor cools at a first cooling rate and further comprising shielding the first thermistor within a tubular sheath disposed within a hermetically sealed shell of the compressor.

10. The method of claim 9 including:

providing a second shielded thermistor within the tubular sheath at an elevation or location different from the first thermistor;

positioning the second thermistor in heat transfer relationship with the fluid;

electrically beating the second thermistor to a heated temperature that is higher than a fluid temperature of the fluid;

after electrically heating the second thermistor, allowing the second thermistor to cool toward the fluid temperature, wherein the second thermistor cools at a second cooling rate; and determining the fluid temperature based on the second cooling rate.

* * * * *